US008250263B2

(12) United States Patent
Kim et al.

(10) Patent No.: US 8,250,263 B2
(45) Date of Patent: Aug. 21, 2012

(54) APPARATUS AND METHOD FOR SECURING DATA OF USB DEVICES

(75) Inventors: Jong Hyun Kim, Incheon (KR); Jeom Gab Kim, Seoul (KR)

(73) Assignee: AHNLAB., Inc., Seoul (KR)

( * ) Notice: Subject to any disclaimer, the term of this patent is extended or adjusted under 35 U.S.C. 154(b) by 0 days.

(21) Appl. No.: 12/988,030

(22) PCT Filed: Apr. 14, 2009

(86) PCT No.: PCT/KR2009/001904
§ 371 (c)(1),
(2), (4) Date: Oct. 15, 2010

(87) PCT Pub. No.: WO2009/128634
PCT Pub. Date: Oct. 22, 2009

(65) Prior Publication Data
US 2011/0047305 A1      Feb. 24, 2011

(30) Foreign Application Priority Data

Apr. 16, 2008  (KR) .......................... 10-2008-0035001

(51) Int. Cl.
*G06F 13/12*      (2006.01)
(52) U.S. Cl. ......................................................... 710/63
(58) Field of Classification Search ........................ None
See application file for complete search history.

(56) References Cited

U.S. PATENT DOCUMENTS

| | | | |
|---|---|---|---|
| 2004/0215971 A1* | 10/2004 | Nam | 713/200 |
| 2007/0043605 A1* | 2/2007 | Fisher et al. | 705/9 |
| 2009/0198765 A1* | 8/2009 | Stamos et al. | 709/202 |
| 2010/0257284 A1* | 10/2010 | Kim | 710/9 |

FOREIGN PATENT DOCUMENTS

KR     100537930 B2     12/2005

OTHER PUBLICATIONS

Ivo Ivanov: "API Hooking Revealed" Dec. 2, 2002, http://www.codeproject.com/KB/system/hooksys.aspx.
The International Search Report dated Nov. 24, 2010 and Written Opinion.
CANT: "Writing Windows WDM Device Drivers," c 1999 ISBN: 0-87930-565-7, Chapters 6-9, 14, 20-23.

\* cited by examiner

*Primary Examiner* — Henry Tsai
*Assistant Examiner* — Aurangzeb Hassan
(74) *Attorney, Agent, or Firm* — Bacon&Thomas, PLLC

(57) ABSTRACT

Security for a USB device is conducted in a protection mode for USB data by hooking an import table of a USB bus class driver, identifying a target IRP, into which the USB data to be protected is inputted, during the hooking routine, and intercepting a real USB data from the IRP. Therefore, input/output data of every USB devices, including a USB keyboard, can be protected in a USB bus class driver level to which a USB input/output request packet is transferred for the first time, thereby protecting the input/output data of the USB devices more safely and basically.

22 Claims, 4 Drawing Sheets

APPARATUS AND METHOD FOR SECURING DATA OF USB DEVICES

FIELD OF THE INVENTION

The present invention relates to a security system for a computer, and more particularly, to a data security apparatus and method for USB (Universal Serial Bus) devices, wherein an import table of a USB bus class driver, to which input data from each USB device connected to a corresponding USB port is transferred for the first time among those in a host level, is hooked in order to identify IRPs (I/O Request Packets) of the USB devices.

BACKGROUND OF THE INVENTION

With the recent increase in electronic financial transactions such as Internet banking or stock exchanges and e-mails or data communications enclosing therein confidential matters, personal or confidential information is more frequently taken for evil purposes through security defects of Internet communications.

Such leakage of information is resulted from various spy wares or hacking programs, which usually intercept data from an input device such as a keyboard and send the data to a target address of e-mail or web-site.

In the prior arts, a filter driver is installed or a hooking method is used in a client driver level that functions to operate a USB keyboard, so as to protect and control input/output data to/from the USB keyboard.

Now, however, some malicious codes are appeared to act in those lower than the client driver level. Accordingly, against the aforementioned malicious codes acting in the lower level, programs using technologies of hooking a hub driver or the USB bus driver are developed to basically protect input/output data of the USB drivers.

For example, a technology of hooking a USB hub driver for intercepting keyboard data is disclosed in the international publication No. WO 2008048035, "APPARATUS AND METHOD FOR PRESERVATION OF USB KEYBOARD", published on Apr. 24, 2008. The apparatus for preservation of USB keyboard in the aforementioned publication prevents data inputted from a keyboard in communication with a main body being transferred to the external through USB.

Those technologies of hooking hub drivers or USB bus drivers, which are lower than the client driver level, seem to be effective against such malicious codes acting in the similar lower level. However, there have been some problems in that crashes may occur when various security products of different companies are hooking in the same level, and system crashes may occur more frequently during a process of restoring functions, which were unloaded for hooking. Further, as the malicious codes become more and more complicated and elaborate, such a method of simply hooking the hub drivers or the USB drivers in the lower level cannot reliably protect data of the USB devices from those malicious codes.

SUMMARY OF THE INVENTION

It is a primary object of the present invention to provide a data security apparatus and method, wherein an import table of a USB bus class driver, to which input data from each USB device connected to a corresponding USB port is transferred for the first time among those in a host level, is hooked in order to identify I/O Request Packets of the USB devices.

In accordance with a first aspect of the present invention, there is provided a security apparatus for a USB device, including: a USB bus class driver for receiving USB data from the USB device and completing an IRP (I/O Request Packet); and a USB bus class driver hooking module installed in the USB bus class driver for intercepting the USB data from the completed IRP before an IoCompleteRequest function is called by the USB bus class driver, in a data protection mode for the USB device, thereby conducting a security operation.

In accordance with a second aspect of the present invention, there is provided a security method for a USB device, including: hooking an IoCompleteRequest function of an import table of a USB bus class driver in a USB data protection mode; identifying IRPs completed by the USB bus class driver, via said hooking of the IoCompleteRequest function; determining a target IRP, where a USB data to be protected is inputted, among the completed IRPs; and intercepting a real USB data from the target IRP where the USB data to be protected is inputted.

According to the invention, an import table of a USB bus class driver is hooked, and a target IRP is identified during the hooking routine, thereby protecting input/output data of every USB devices, including a USB keyboard, in a USB bus class driver level to which input data from the USB device is transferred for the first time. Therefore, the input/output data of USB devices can be more safely protected.

DETAILED DESCRIPTION OF THE PREFERRED EMBODIMENTS

Hereinafter, an exemplary embodiment of the present invention will be described with reference to the accompanying drawings.

Figure 1:
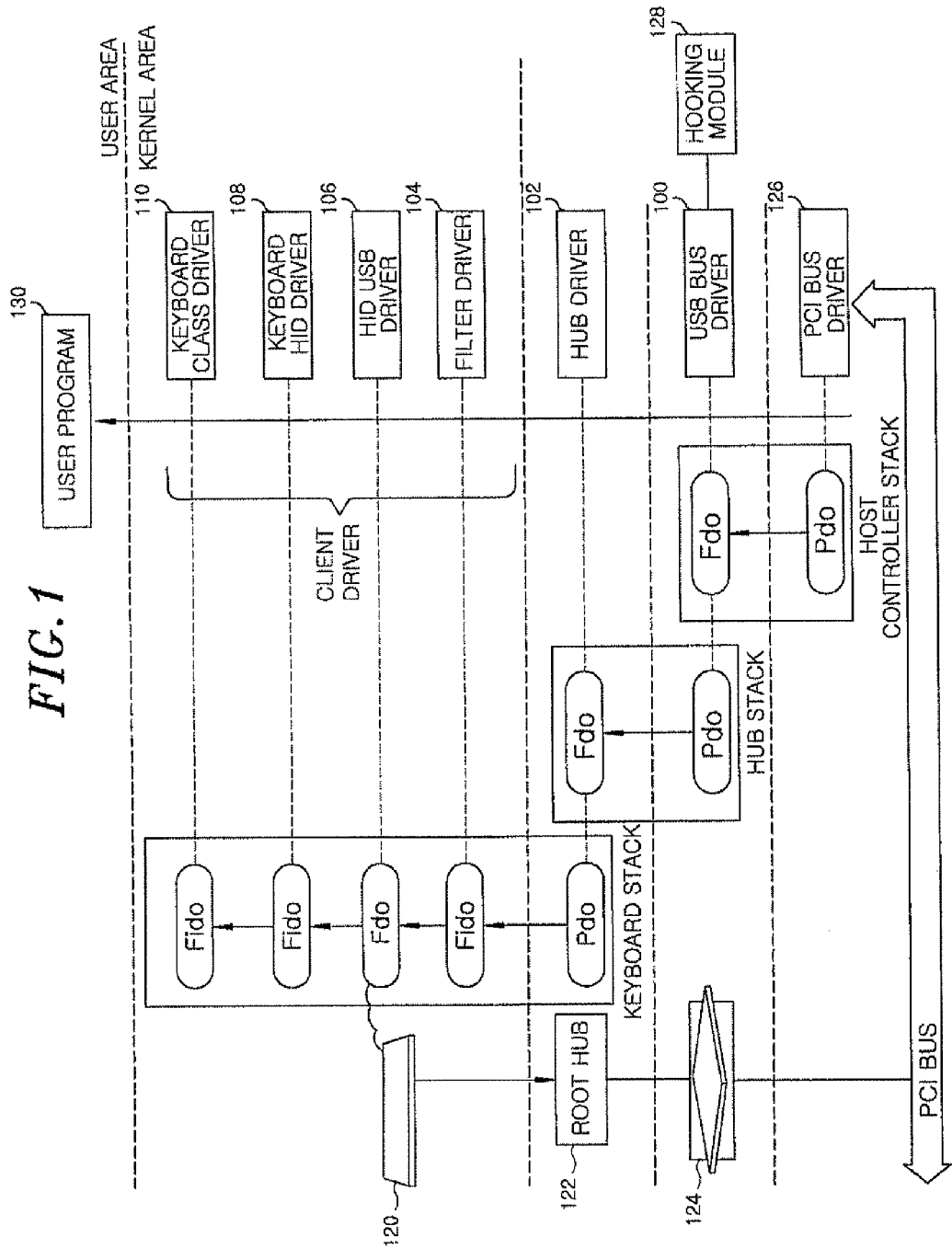
FIG. 1 shows a block diagram illustrating a driver architecture for realizing USB device data security, which is applied to embodiments of the present invention.

FIG. 1 shows a block diagram illustrating a driver architecture for processing input data from a USB keyboard, which is one of USB devices to which embodiments of the present invention can be applied. Though a data security herein is explained with reference to the USB keyboard among various USB devices for the convenience of explanation, it is apparent to those skilled in the art that the present invention can be applied to the other USB devices like a USB mouse and a USB memory device, or the like.

As shown in FIG. 1, the driver architecture for connecting a USB keyboard 120 includes a user program 130 and client level drivers such as a keyboard class driver 100, a keyboard HID driver 108, a HID USB driver 106, a filter driver 104, a hub driver 102, and a USB bus driver 100. Input data from the USB keyboard 120 is transferred to the user program 130 via the USB bus driver 100, the USB hub driver 102, the HID USB driver 106, the keyboard HID driver 108, and the keyboard class driver 110 successively in that order.

Now, devices for processing input data from the USB keyboard and operations in each of the driver levels will be explained in detail. A root hub 122 includes ports to which various USB devices such as the USB keyboard 120, the USB mouse, and the USB memory device can be mechanically connected. In addition, the root hub 122 is connected to a USB host controller 124. The USB controller 124 is connected to a host via a PCI bus. The host may include a PC (Personal Computer).

Among the client drivers, the keyboard class driver 110, the keyboard HID driver 108, and the HID USB driver 106 are indispensable for the operation of the USB keyboard 120 and are provided by a computer operating system, wherein these three drivers transfer input data from the USB keyboard 120 to the user program 130 so that the input data from the keyboard can be identified.

The filter driver 104, which is implemented in a lower level than the HID USB driver 106, modifies an IRP format for an IRP (I/O Request Packet) used to transfer data of USB device between user program 130 and USB device, so that the IRP can be identified as being corresponding to data input from one of the USB keyboard, the USB mouse, or the USB memory device according to the USB device type to protect. That is, when the filter driver 104 receives an IRP from the user program 130, the filter driver 104 copies the IRP and then creates a modified IRP' by inserting therein an identifier to provide the modified IRP' to the USB bus driver 100, so that a USB bus class driver hooking module 128 inside the USB bus driver 100 can identify that the IRP is corresponding to data from one of USB devices such as the USB keyboard 120, the USB mouse or the USB memory device.

It may be possible to locate the filter driver 104 into the root hub 122 so as to classify the types of IRPs. In such a case of locating the filter driver 104 into the root hub 122, however, it is difficult to identify whether input data from the root hub is originated from USB keyboard data, USB mouse data, or USB memory data because various USB devices besides the USB keyboard 120 may have been connected to the root hub 122. Further, such a case may increase the amount of data, which makes it complicate to process the data.

The USB bus driver 100, which is connected to the host controller 124 via a PCI bus, transfers input data from various USB devices to the user program 130 through the IRP transmitted from the user program 130 carrying the input data.

FDO (Functional Device Object) is a structure created by a function driver to control hardwares, and FIDO (Filter Device Object) is a structure created by the keyboard class driver 110, the keyboard HID driver 108, or the filter driver 104, and the like.

A usual malicious program conducts a hacking attack by intercepting the keyboard data via inserting an abnormal hooking module into the client driver level or adding an abnormal filter driver.

Accordingly, in the present invention, a technology of hooking the USB bus driver 100 that is lower than the client driver level is suggested so as to more effectively match against malicious codes acting in the lower level. In this case, after the hooking module 128 is implemented in the USB bus class driver inside the USB bus driver 100, it hooks input/output-related functions of the USB bus class driver and changes just one address, thereby easily and simply protecting important input data.

Figure 2:
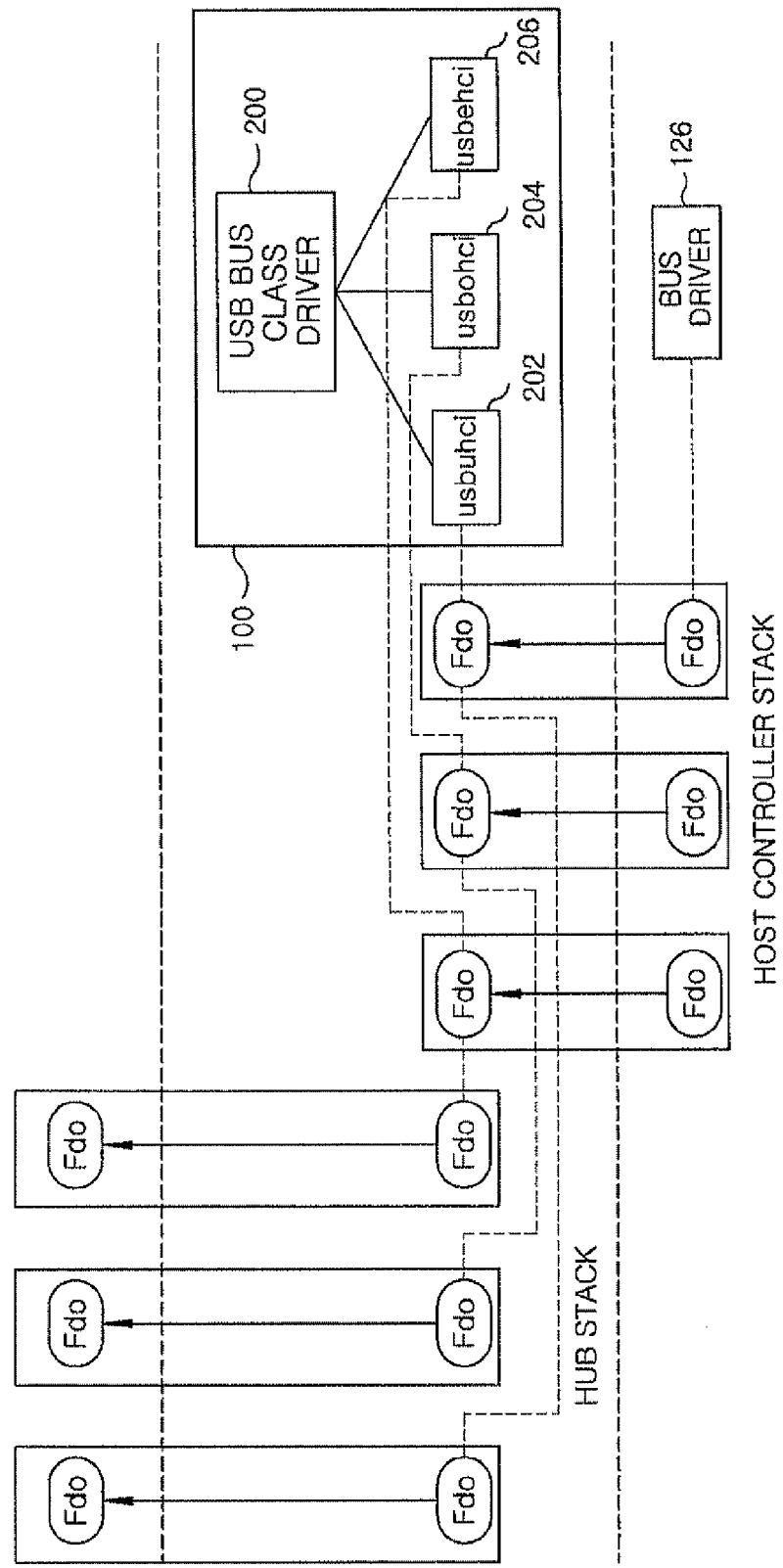
FIG. 2 is a block diagram illustrating internal architecture of a USB bus driver in accordance with an embodiment of the present invention.
Figure 3:
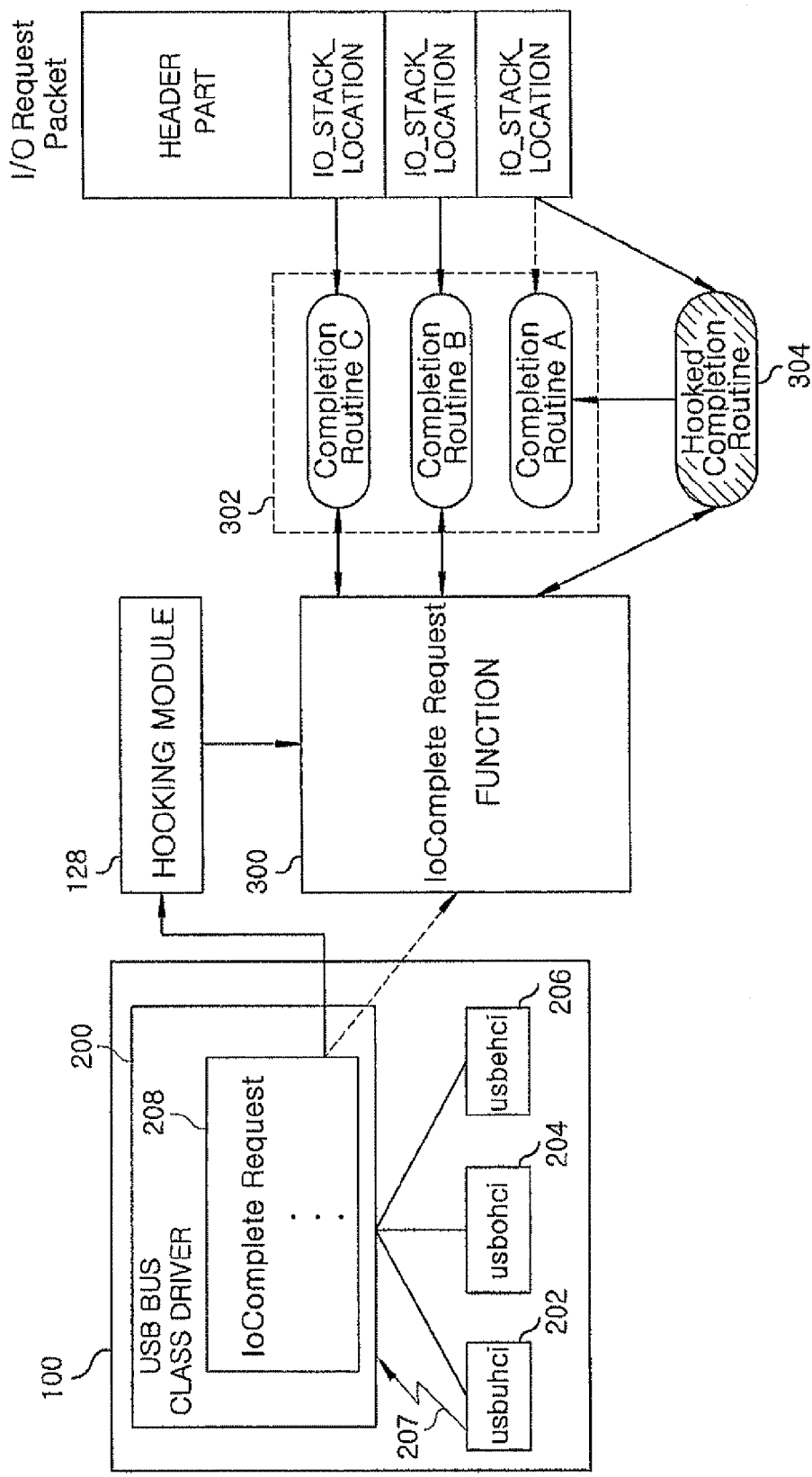
FIG. 3 depicts a block diagram illustrating an operation of hooking USB data in the USB driver as shown in FIG. 2.

That is, in a data protection mode for the USB keyboard among the USB devices, the hooking module 128 of the USB bus class driver hooks the address of the IoCompleteRequest function that is the input/output-related function of the USB bus class driver. Then, before the IoCompleteRequest function is called by the USB bus class driver 200, the hooking module 128 intercepts a real USB keyboard data from an IRP, which has been completed by inputting the keyboard data therein to protect the keyboard data, thereby simply conducting the securing of the USB keyboard. With reference to FIGS. 2 and 3, the operation of hooking the IoCompleteRequest functions by the USB bus class driver hooking module 128 will be explained in detail.

FIG. 2 is a block diagram illustrating internal architecture of the USB bus driver in accordance with an embodiment of the present invention, and FIG. 3 depicts a block diagram illustrating an operation of hooking USB data in the USB driver as shown in FIG. 2.

As shown in FIGS. 2 and 3, the USB bus driver 100 includes miniport drivers 202, 204 and 206, and a USB bus class driver 200.

In typical, there are two host controllers for connecting USB devices in a computer, and drivers for controlling them are classified into three types such as UHCI (USB host controller interface) type, OHCI (open host controller interface) type, and EHCI (enhanced host controller interface) type. Whenever a PCI bus driver 126 finds and identifies each host controller connected to a PCI bus, it creates FDO and PDO data structures. The miniport drivers 202, 204 and 206 for handling hardware-specific operations are constructed by three drivers (USBUHCI, USBOHCI and USBEHCI), and control each host controller. When USB data is inputted from various USB devices including the USB keyboard, the miniport drivers 202 to 204 notify the USB bus class driver 200 of that fact via a notification 207 (FIG. 3).

The USB bus class driver 200 receives IRP (I/O Request Packet), which requests USB data inputting, from the user program 130 of a user area and keeps it for a while. Then, when the USB data is inputted from the USB keyboard, the USB bus class driver 200 completes the IRP by inputting the USB data value into a specific area of the IRP. In this case, the USB bus class driver 200 calls the IoCompleteRequest function, which is one of OS functions, thereby completing the operation of inputting the USB data. Then, the IoCompleteRequest function, which is called by the USB bus class driver 200, calls successively callback functions 302 registered respectively by the HID USB driver 106, the filter driver 104, and the hub driver 102, thereby notifying the completion of the IRP.

One of conventional hacking methods uses such an operation feature of the USB bus class driver 200. That is to say, an abnormal callback function 304 for hooking data is registered in a lower level than those of the normal callback functions 302 for the other drivers, in order to be called for the first time when the keyboard data is completed by the IoCompleteRequest function, so that it can intercept and steal key values.

In order to prevent such a hacking attack, the present invention proposes the technology of hooking the address of the IoCompleteRequest function that is an input/output-related function of the USB bus class driver 200. Therefore, before the IoCompleteRequest function is called by the USB bus class driver 200, a real USB device data from an IRP, which is completed by inputting the USB device data therein, can be intercepted to protect the USB device data. For example, assuming that the USB bus class driver 200 utilizes ten of OS functions including the IoCompleteRequest function, ten addresses that respectively corresponds thereto are made to be successively inputted into an import table 208 of the USB bus class driver 200. Accordingly, if the IoCompleteRequest function address in the import table is modified into the address of the hooking module, the hooking module 128 can be called first before being called the IoCompleteRequest function, thereby enabling the hooking of key data. It will be apparent to those skilled in the art that an original IoCompleteRequest function shall be called after the hooking module 128 is called.

That is to say, during the data protection mode for USB keyboard among USB devices, the USB bus class driver hooking module 128 hooks the IoComplete Request function by modifying the IoComplete Request function address recorded in the import table of the USB bus class driver 200 into its own address, thereby making itself be called first before the USB bus class driver 200 calls the IoCompleteRequest function.

Then, the USB bus class driver hooking module 128 intercepts a real USB keyboard data from the IRP that has been completed by inputting the USB keyboard data thereinto, inserts an arbitrary value into the IRP, and then calls the IoCompleteRequest function, thereby securing the keyboard data. Herein, the hooking module may encode the USB keyboard data intercepted from the IRP by using a specific security module, and transfers the encoded USB keyboard data to the user program or to the other target server via networks.

Figure 4:
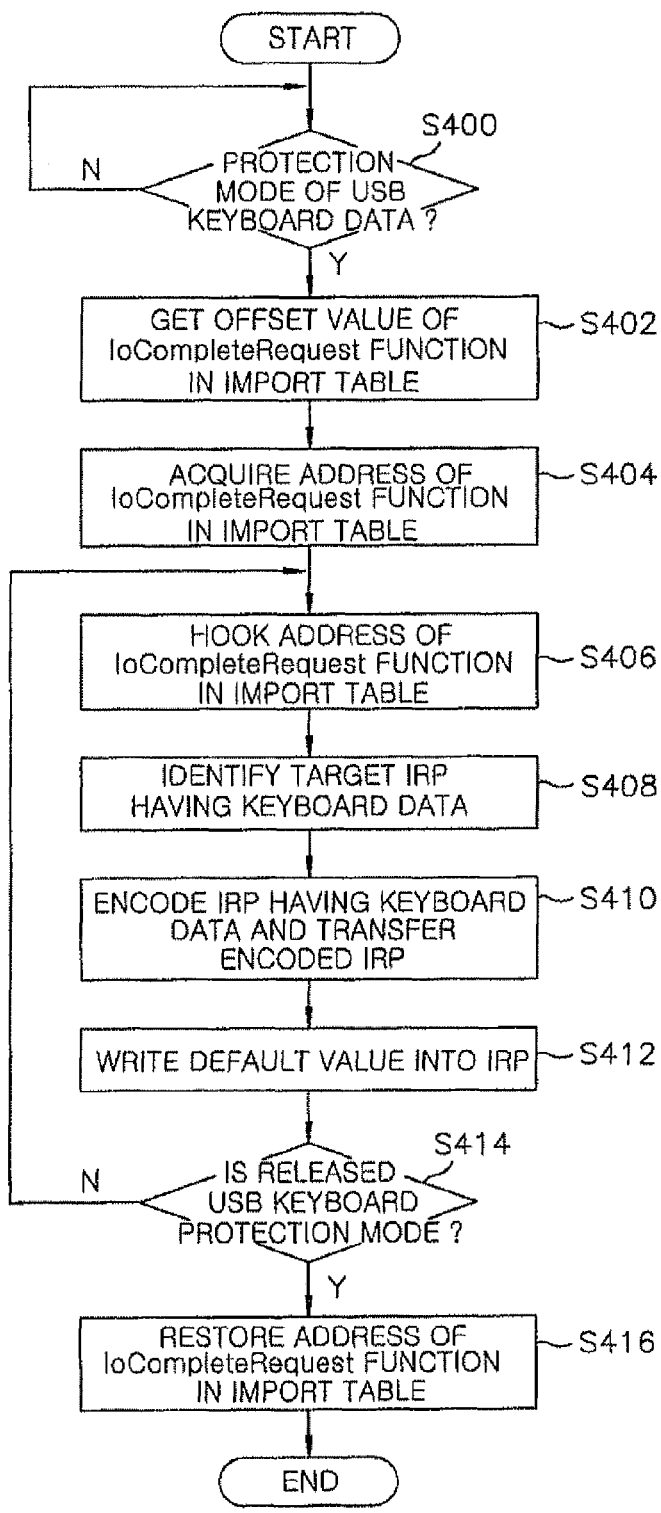
FIG. 4 provides a flow diagram illustrating operation for protecting USB data in a USB bus class driver hooking module in accordance with an embodiment of the present invention.

FIG. 4 provides a flow diagram illustrating an operation of hooking USB keyboard data in a USB bus class driver of a lower level to process input/output data from USB devices in accordance with the present invention.

Referring now to FIGS. 1 to 4, the embodiment of the present invention will be explained in detail. Though a data security herein is explained with reference to the USB keyboard among various USB devices for the convenience of explanation, it will be apparent to those skilled in the art that the present invention can be simultaneously applied to the other USB devices like a USB mouse and a USB memory device, or the like.

When a user inputs an important data such as passwords for Internet banking service to a bank server by using a keyboard of a computer, the USB bus class driver hooking module 128 installed in the computer for securing the keyboard data detects it as a point to start securing the keyboard data.

For example, when the user locates a cursor on a password input window of a display screen of a user program, the USB bus class driver hooking module 128 installed in the computer is noticed of the location of the cursor on the password input window and detects it as the starting point to secure the keyboard data.

When detecting the starting point to secure the keyboard data, the USB bus class driver hooking module 128 determines whether or not a keyboard data protection mode has been set in step S400, and then conducts necessary operations step by step to secure the keyboard data, which is inputted from the USB keyboard by the user.

If it is determined that the keyboard data protection mode has been set already, the USB bus class driver hooking module 128 proceeds to next step S402 to calculate an offset value in the import table based on an image file of the USB bus class driver 200, the offset value having a location information of the IoCompleteRequest function, which is an OS function called when the keyboard data of the import table 208 has been completed.

It is explained already that the import table 208 is a table in which addresses of OS functions called for the operation of the USB bus class driver 200 are written, and the table has also the address information of the IoCompleteRequest function that is called when the input of the USB keyboard is completed. In step S402, therefore, the hooking module 128 gets the offset value in the import table 208, which has the location information of the IoCompleteRequest function. If an address having the location information of the IoCompleteRequest function is abnormally changed by a malicious hacking attack, it is difficult to search the IoCompleteRequest function listed in the import table 208, based on the previously known address having the location information of the IoCompleteRequest function. Such a problem, however, can be prevented by the aforementioned step of getting the offset value having the location information of the IoCompleteRequest function listed in the import table 208.

After getting the offset value having the location information of the IoCompleteRequest function listed in the import table 208, the USB bus class driver hooking module 128 proceeds to step S404 to acquire a real address of the import table from the USB bus class driver 200 loaded in a memory. Then, by using the offset value, the address having the location information of the IoCompleteRequest function listed in the import table 208 can be acquired.

Next, the USB bus class driver hooking module 128 transforms the address information of the IoCompleteRequest function listed in the import table 208 into the address information of itself in step S406.

Accordingly, when a data inputting is resulted from the USB keyboard 120, the USB mouse, or the USB memory device connected to the root hub 122 and the IRP is then completed, the hooking module 128 for securing the USB data is called before being called the IoCompleteRequest function, instead of calling the IoCompleteRequest function by the USB bus class driver 200 and in turn the callback functions 302 registered in the IoCompleteRequest function, so that the completion of the USB data inputting is noticed for the first time to the USB bus class driver hooking module 128 via the USB bus class driver 200.

In step S408, by using the identifier previously inserted by the filter driver 104, the USB bus class driver hooking module 128 identifies a target IRP having the USB keyboard data, among various IRPs completed for inputting by the USB bus class driver 200. Therefore, in next step S410, the USB bus class driver hooking module 128 encodes the IRP having the keyboard data and copies the encoded IRP into a certain area of a memory. The encoded IRP can be transferred to a target user program or the other network server via Internet.

In order to make it possible to identify the target IRP having the USB keyboard data, among the completed IRPs, the filter driver 104 inserts the identifier, by which the hooking module 128 can identify whether it is for the USB keyboard data or not, into the IRP for the keyboard data during the procedure in which the IRP is transferred from the user program 130 to the USB bus driver 100. When the IRP having the identifier is transferred to the USB bus driver 100, the USB bus class driver hooking module 128 detects the IRP having the identifier as the one having the USB keyboard data inputted therein while examining IRPs completed for inputting.

After intercepting the USB keyboard data value actually inputted by the user, from the IRP having the USB keyboard data in the aforementioned step S410, the hooking module 128 writes a certain meaningless default value as an alternative USB keyboard value into the IRP once having the original USB keyboard data value and transfers the IRP to the user program, in a step S412, thereby preventing a malicious function, which may be abnormally inserted into the drivers, from sending out the USB keyboard data during the procedure of transferring the USB keyboard data to the user program.

Subsequently, in next step S414, the USB bus class driver hooking module 128 detects whether or not the protection mode for the USB keyboard data is released to determine whether it is still necessary to secure the keyboard data. For example, if the user finishes inputting the passwords in the window of the display screen and moves the cursor to the other window that is not necessary to secure, the hooking module 128 determines that the keyboard data security is not necessary now. If it is determined that the keyboard data security is not necessary, the protection mode for the USB keyboard data is released and the address of the IoCompleteRequest function listed in the import table 208 of the USB bus class driver 200 is restored into the original one, in a step S416.

According to the invention, an import table of a USB bus class driver is hooked, and a target IRP is identified during the hooking routine, thereby protecting input/output data of every USB devices including a USB keyboard, in a USB bus class driver level to which input data from the USB device is transferred for the first time. Therefore, the input/output data of USB devices can be more safely protected.

As described above, the embodiments have been described in the specification and the drawings. The specific terms used herein are just illustrative, but they are not intended to limit the subject matter of the present invention or the scope of the present invention described in the attached claims. It will be understood by those skilled in the art that various modifications and equivalents may be made. Therefore, the scope of the present invention should be defined by the appended claims rather than the description and the drawings.

What is claimed is:

1. A security apparatus for protecting USB data, wherein the USB data is provided by a USB device and input to an input/output request packet (IRP) by a USB bus class driver to complete the IRP, the apparatus comprising:
    a filter driver configured to modify a format of the IRP by inserting an identifier into the IRP in order to identify which USB device provides the USB data to be input to the IRP; and
    a USB bus class driver hooking module configured to perform, in a USB data protection mode, a security operation that includes:
        hooking an IoCompleteRequest function called by the USB bus class driver and used for notifying the completion of the IRP;
        detecting a target IRP having the USB data to be protected by checking the identifier of the completed IRP;
        intercepting, when the target IRP is detected, the USB data from the target IRP before the IoCompleteRequest function is called by the USB bus class driver.

2. The security apparatus of claim 1, wherein said hooking the IoCompleteRequest function includes:
    locating an address listed in an import table of the USB bus driver and used for calling the IoCompleteRequest function.

3. The security apparatus of claim 1, wherein said hooking the IoCompleteRequest function includes:
    modifying an address listed in an import table of the USB bus class driver and used for calling the IoCompleteRequest function into an address of the USB bus class driver hooking module.

4. The security apparatus of claim 1, wherein the security operation further includes: encoding the intercepted USB data by using a security module; and
    transferring the encoded USB data to a user program or a target server.

5. The security apparatus of claim 2, wherein said locating the address is performed by calculating an offset value in the import table based on an image file of the USB bus class driver loaded on a memory of a computer, the offset value having location information of the address for calling the IoCompleteRequest function.

6. The security apparatus of claim 2, wherein said locating the address is performed by searching for an address value of the IoCompleteRequest function in the import table, wherein the address value is provided to the USB bus class driver hooking module in advance.

7. The security apparatus of claim 3, wherein the USB bus class driver hooking module is configured to restore, when the USB data protection mode is deactivated, the modified address listed in the import table of the USB bus class driver into an original address that existed prior to said modifying the address.

8. The security apparatus of claim 1, wherein the USB bus class driver hooking module is configured to activate the USB data protection mode when detecting that a cursor is located on a window for inputting data to be protected in a display screen of a user program running in a computer.

9. The security apparatus of claim 1, wherein the USB device is a USB keyboard, a USB mouse, or a USB memory device.

10. A security method for protecting USB data wherein the USB data is provided by a USB device and input to an input/output request packet (IRP) by a USB bus class driver to complete the IRP, the method comprising:
    modifying a format of the IRP by inserting an identifier into the IRP in order to identify which USB device provides the USB data to be inputted to the IRP;
    conducting, in a USB data protection mode, a security operation that includes:
        hooking an IoCompleteRequest function called by the USB bus class driver and used for notifying the completion of the IRP;
        detecting a target IRP having the USB data to be protected by checking the identifier of the completed IRP;
        intercepting, when the target IRP is detected, the USB data from the target IRP before the IoCompleteRequest function for notifying the completion of the IRP is called by the USB bus class driver.

11. The security method of claim 10, wherein said hooking the IoCompleteRequest function includes:
    locating an address listed in an import table of the USB bus class driver for calling the IoCompleteRequest function.

12. The security method of claim 11, wherein said locating the address for calling the IoCompleteRequest function is performed by calculating an offset value in the import table based on an image file of the USB bus class driver loaded on a memory of a computer, the offset value having a location information of the address for calling the IoCompleteRequest function.

13. The security method of claim 11, wherein said locating the address for calling the IoCompleteRequest function is performed by searching for an address value of the IoCompleteRequest function in the import table wherein the address value is provided to the hooking module in advance.

14. The security method of claim 10, wherein the security operation further includes:
    encoding the intercepted USB data by using a specific security module; and
    transferring the encoded USB data to a upper class user program or a target server.

15. The security method of claim 10, the security operation further includes:
    inserting fake data into the completed IPR after said intercepting the USB data is performed.

16. The security method of claim 10, further comprising:
activating the USB data protection mode when detecting that a cursor is located on a window for inputting data to be protected in a display of a user program running in a computer.

17. The security method of claim 10, wherein the USB device is a USB keyboard, a USB mouse, or a USB memory device.

18. The security apparatus of claim 1, wherein the security operation further includes:
inserting fake data into the target IRP after said intercepting the USB data is performed.

19. The security apparatus of claim 1, wherein the security operation further includes:
calling the IoCompleteRequest function after said intercepting the USB data is performed.

20. The security method of claim 10, wherein said hooking the IoCompleteRequest function includes:
modifying the address into an address of a hooking module for intercepting the USB data.

21. The security method of claim 10, wherein the security operation further includes:
calling the IoCompleteRequest function after said intercepting the USB data is performed.

22. The security method of claim 20, further comprising:
restoring, when the USB data protection mode is deactivated, the modified address listed in the import table of the USB bus class driver into an original address that existed prior to said modifying the address.

* * * * *